(12) United States Patent
Proux

(10) Patent No.: US 10,789,281 B2
(45) Date of Patent: Sep. 29, 2020

(54) REGULARITIES AND TRENDS DISCOVERY IN A FLOW OF BUSINESS DOCUMENTS

(71) Applicant: Xerox Corporation, Norwalk, CT (US)

(72) Inventor: Denys Proux, Vif (FR)

(73) Assignee: XEROX CORPORATION, Norwalk, CT (US)

( * ) Notice: Subject to any disclaimer, the term of this patent is extended or adjusted under 35 U.S.C. 154(b) by 286 days.

(21) Appl. No.: 15/637,211

(22) Filed: Jun. 29, 2017

(65) Prior Publication Data

US 2019/0005050 A1 Jan. 3, 2019

(51) Int. Cl.

| | | |
|---|---|---|
| G06F 16/35 | (2019.01) | |
| G06F 16/00 | (2019.01) | |
| G06F 16/28 | (2019.01) | |
| G06K 9/00 | (2006.01) | |
| G06F 16/31 | (2019.01) | |
| G06F 40/30 | (2020.01) | |
| G06F 40/157 | (2020.01) | |
| G06K 9/62 | (2006.01) | |
| G06F 16/27 | (2019.01) | |
| G06F 16/33 | (2019.01) | |
| G06F 40/211 | (2020.01) | |
| G06F 40/295 | (2020.01) | |

(52) U.S. Cl.
CPC ............ G06F 16/355 (2019.01); G06F 16/00 (2019.01); G06F 16/285 (2019.01); G06F 16/313 (2019.01); G06F 16/35 (2019.01); G06F 16/353 (2019.01); G06F 40/157 (2020.01); G06F 40/30 (2020.01); G06K 9/00463 (2013.01); G06F 16/27 (2019.01); G06F 16/3338 (2019.01); G06F 40/211 (2020.01); G06F 40/295 (2020.01); G06K 9/6223 (2013.01); G06K 2209/01 (2013.01)

(58) Field of Classification Search
USPC ........................................................ 707/637
See application file for complete search history.

(56) References Cited

U.S. PATENT DOCUMENTS 5,787,420 A  7/1998 Tukey et al.
8,726,148 B1 * 5/2014 Battilana ............... G06F 17/273
715/234

(Continued)

OTHER PUBLICATIONS

Chawathe, "Comparing Hierarchical Data in External Memory," Proc. Int'l Conf. on Very Large Databases (VLDB), vol. 99, pp. 90-101 (1999).

(Continued)

*Primary Examiner* — Hosain T Alam
*Assistant Examiner* — Nicholas E Allen
(74) *Attorney, Agent, or Firm* — Fay Sharpe LLP

(57) ABSTRACT

A method for encoding documents includes building or otherwise providing a condensed dictionary including identifiers for block headers identified in text blocks extracted from a collection of training documents. For at least one test document a set of text content blocks is identified. For each of the text content blocks in the set, a block header is identified. Each block header in the training and test documents includes a sequence includes no more than a predetermined maximum number of characters. An encoding of the test document is generated, based on the identifiers of the block headers identified in the test document that are in the condensed dictionary.

20 Claims, 5 Drawing Sheets

(56) References Cited

U.S. PATENT DOCUMENTS

| | | | | |
|---|---|---|---|---|
| 9,336,192 | B1* | 5/2016 | Barba | G06F 17/277 |
| 9,443,139 | B1* | 9/2016 | Nally | G06K 9/00469 |
| 2005/0257140 | A1* | 11/2005 | Marukawa | G06F 17/218 |
| | | | | 715/255 |
| 2009/0055381 | A1* | 2/2009 | Wu | G06F 17/2745 |
| 2011/0249905 | A1* | 10/2011 | Singh | G06K 9/00449 |
| | | | | 382/225 |
| 2011/0295854 | A1* | 12/2011 | Chiticariu | G06F 16/313 |
| | | | | 707/737 |
| 2013/0262465 | A1 | 10/2013 | Gallé et al. | |
| 2013/0343658 | A1 | 12/2013 | Dejean | |
| 2014/0365872 | A1 | 12/2014 | Dejean | |
| 2015/0100308 | A1* | 4/2015 | Bedrax-Weiss | G06F 17/2735 |
| | | | | 704/10 |
| 2015/0127323 | A1 | 5/2015 | Jacquet et al. | |
| 2015/0169510 | A1 | 6/2015 | Dejean et al. | |
| 2015/0339288 | A1* | 11/2015 | Baker | G06F 17/2705 |
| | | | | 704/9 |
| 2016/0063322 | A1 | 3/2016 | Dejean | |
| 2016/0098645 | A1* | 4/2016 | Sharma | G06N 7/005 |
| | | | | 706/12 |
| 2016/0179923 | A1 | 6/2016 | Chehreghani et al. | |
| 2016/0188566 | A1* | 6/2016 | Jifroodian-Haghighi | |
| | | | | G09B 5/02 |
| | | | | 704/10 |
| 2016/0232160 | A1* | 8/2016 | Buhrmann | G06F 17/2247 |
| 2016/0232456 | A1* | 8/2016 | Jain | G06N 20/00 |
| 2017/0124413 | A1* | 5/2017 | Deng | G06K 9/344 |
| 2017/0161390 | A1* | 6/2017 | Kavas | G06F 16/245 |

OTHER PUBLICATIONS

Dalamagas, et al., "A Methodology for Clustering XML Documents by Structure," Information Systems, 31(3), pp. 187-228 (2006).

Flesca, "Fast detection of XML structural similarities," IEEE Trans. Knowl. Data Engin., vol. 7, No. 2, pp. 160-175 (2005).

Fodor, "A survey of dimension reduction techniques," Technical report, Center for Applied Scientific Computing, Lawrence Livermore National Laboratory, 9, pp. 1-18 (2002).

Harley, et al., "Evaluation of Deep Convolutional Nets for Document Image Classification and Retrieval," Proc. 13$^{th}$ Conf. on Document Analysis and Recognition (ICDAR), pp. 991-995 (2015).

Kurgan, et al., "Semantic mapping of XML tags using inductive machine learning," 11th Int'l Conf. on Information and Knowledge Management (ICMLA), pp. 99-109 (2002).

Kutty, et al., "Combining the structure and content of XML documents for clustering using frequent subtrees," Workshop of the INitiative for the Evaluation of XML Retrieval (INEX), pp. 391-401 (2008).

Shen, et al., "Clustering schemaless XML documents," 11th Int'l Conf. on Cooperative Information Systems, on the Move to Meaningful Internet Systems 2003: CoopIS, DOA, and ODBASE, vol. 2888 of the series Lecture Notes in Computer Science, pp. 767-784 (2003).

Tekli, et al., "A Novel XML Document Structure Comparison Framework based-on Subtree Commonalities and Label Semantics," Web Semantics: Science, Services and Agents on the World Wide Web, vol. 11, pp. 14-40 (2012).

Vergara, et al., "A Review of Feature Selection Methods Based on Mutual Information," Neural Computing & Applications, vol. 24 (1), pp. 175-186 (2014) (arXiv:1509.07577).

* cited by examiner

FIG. 4

| | Invoice No. 195780 |
|---|---|
| ABC Co. | |
| 100 Green Lane, Newtown | |

For Services Rendered
To: Mr. G.K. Brown,
12 Station St, Newtown

| Date | Item | Amount |
|---|---|---|
| 03/05/18 | Call out charge | 70.00 |
| 03/05/18 | Materials | 125.50 |
| 03/05/15 | Labor | 140.00 |
| | Tax | 16.45 |
| | Total | 351.95 |

Prompt payment is requested

REGULARITIES AND TRENDS DISCOVERY IN A FLOW OF BUSINESS DOCUMENTS

BACKGROUND

The exemplary embodiment relates to document processing and finds particular application in connection with a system and method for extracting regularities in documents to assist in tasks such as document categorization, clustering, and the like.

Document clustering is one of several methods which have been used for automatically extracting information from a collection of documents Clustering aims to group documents which relate to the same topic and is of particular benefit when no information is available about the content of a particular corpus.

Content-based methods of clustering typically entail generating a vector-space representation of words in each document, allowing documents with similar representations to be grouped in the same cluster. See, for example, Kurgan, et al., "Semantic mapping of XML tags using inductive machine learning," 11th Int'l Conf. on Information and Knowledge Management (ICMLA), pp. 99-109 (2002), Shen, et al., "Clustering schemaless XML documents," 11th Int'l Conf. on Cooperative Information Systems, Vol. 2888 of LNCS, pp. 767-784 (2003). However, such techniques do not take into account the structure within the clustered documents, such as the arrangement of the text.

Clustering methods that take into account document structure are often based on tree representation and edit distance or edit graphs to detect similarities and possible mapping between tree structures provided by the XML format of the documents. See, Dalamagas, et al., "A Methodology for Clustering XML Documents by Structure," Information Systems, 31(3), pp. 187-228 (2006); Flesca, "Fast detection of XML structural similarities," IEEE Trans. Knowl. Data Engin., Vol. 7, No. 2, pp. 160-175 (2005); Chawathe, "Comparing Hierarchical Data in External Memory," Proc. Int'l Conf. on Very Large Databases (VLDB), Vol. 99, pp. 90-101 (1999). However, these methods are not suited to documents which lack hierarchical structural information, such as those produced by optical character recognition (OCR) of scanned paper documents.

Hybrid clustering methods take both content and structure into account. However many of these are dedicated to specific types of structured format (e.g., XML, HTML) that provide access to heritage links and nested elements that can be used for comparing documents. See, Kutty, et al., "Combining the structure and content of XML documents for clustering using frequent subtrees," Workshop of the INitiative for the Evaluation of XML Retrieval (INEX), pp. 391-401 (2008). Some methods also use section titles of the table of contents to compute structure alignment using this hierarchy as a basis for the comparison. See, Tekli, et al., "A Novel XML Document Structure Comparison Framework based-on Subtree Commonalities and Label Semantics," Web Semantics: Science, Services and Agents on the World Wide Web, Vol. 11, pp. 14-40 (2011). Again, the concept of tree alignment is central to the method.

Previously, clustering documents based on the limited structural information in the OCR output has not been considered practical, since the limited structural information provided varies considerably from page to page, even when the pages are from the same business workflow, such as forms, and appear visually similar.

It would be advantageous to be able to make use of document structure for clustering when the documents are simply the raw output from OCR software.

INCORPORATION BY REFERENCE

The following references, the disclosures of which are incorporated herein by reference, are mentioned:

U.S. Pub. No. 20130343658, published Dec. 26, 2013, entitled SYSTEM AND METHOD FOR IDENTIFYING REGULAR GEOMETRIC STRUCTURES IN DOCUMENT PAGES, by Hervé Déjean; U.S. Pub. No. 20150169510, published Jun. 18, 2015, entitled METHOD AND SYSTEM OF EXTRACTING STRUCTURED DATA FROM A DOCUMENT, by Hervé Déjean, et al.; U.S. Pub. No. 20140365872, published Dec. 11, 2014, entitled METHODS AND SYSTEMS FOR GENERATION OF DOCUMENT STRUCTURES BASED ON SEQUENTIAL CONSTRAINTS, by Hervé Déjean.

U.S. Pub. No. 20160063322, published Mar. 3, 2016, entitled METHOD AND SYSTEM OF EXTRACTING LABEL: VALUE DATA FROM A DOCUMENT, by Hervé Déjean.

BRIEF DESCRIPTION

In accordance with one aspect of the exemplary embodiment, a method for encoding documents includes, for each training document of a collection of training documents, identifying a set of text content blocks. For each of the text content blocks in the set, a block header is identified. The block header includes a sequence consisting of no more than a predetermined maximum number of characters. A condensed dictionary is built from the block headers identified for the collection of training documents, the condensed dictionary including an identifier for each of only a subset of the block headers identified in the collection of training documents. For at least one test document, a set of text content blocks is identified. For each of the text content blocks in the set, a block header is identified. The block header includes a sequence consisting of no more than the predetermined maximum number of characters. An encoding of the test document is generated, based on the identifiers of the identified block headers that are in the condensed dictionary.

At least one of the identifying of the set of text content blocks, identifying of the block headers, building the condensed dictionary, and generating the encoding of the test document may be performed with a processor.

In accordance with another aspect of the exemplary embodiment, a system for encoding documents includes a condensed dictionary, stored in memory, built from a collection of training documents. The condensed dictionary includes an index for each of a set of block headers identified in the document collection. Each of the block headers includes an initial sequence consisting of no more than a predetermined maximum number of characters from a respective identified text block of at least one of the training documents. The condensed dictionary includes identifiers for only a subset of the block headers identified in the training collection. The subset includes block headers occurring more frequently in the training collection than others of the identified block headers. A block extractor extracts text blocks from a test document. A content extractor extracts block headers from the text blocks extracted from the test document. An encoding component generates an encoding of the test document, based on the identifiers of the identified block headers that are in the condensed dictionary. A processor implements the block extractor, content extractor, and encoding component.

In accordance with another aspect of the exemplary embodiment, a method for encoding documents includes providing a condensed dictionary, built from a collection of training documents. The condensed dictionary includes an index for each of a set of block headers identified in the training document collection. Each block header includes an initial sequence consisting of no more than a predetermined maximum number of characters from a respective identified text block of at least one of the training documents. The condensed dictionary includes an identifier for each of only a subset of the block headers identified in the training collection. The subset includes block headers occurring more frequently in the training collection than others of the identified block headers. A collection of test documents is received. For each test document, a set of text content blocks is identified and for each of the text content blocks in the set, a block header is identified. The block header includes a sequence consisting of no more than the predetermined maximum number of characters. An encoding of the test document is generated, based on the identifiers of the identified block headers that are in the condensed dictionary. The method further includes performing at least one of: computing a similarity between test documents in the collection of test documents, based on their encodings, and clustering test documents in the collection of test documents, based on their encodings.

At least one of the identifying of the set of text content blocks, identifying of the block headers, generating the encoding, and performing the at least one of computing a similarity and clustering test documents is performed with a processor.

BRIEF DESCRIPTION OF THE DRAWINGS

FIG. 4 illustrates an example document; and

DETAILED DESCRIPTION

The exemplary system and method described herein enable discovering, in an unsupervised manner, regularities and trends in a collection of documents, such as business documents processed by a given organization. These regularities can then be exploited for clustering documents.

While existing clustering methods can be used to group documents according to their main theme (e.g., separating scientific papers according to their field of study such as physics or biology, or splitting news articles between themes such as sport, business, politics, etc.), the present system and method consider document structure as well as content in discovering these regularities.

In the method, the characteristic elements that make a document similar to another are first identified. Then documents are characterized based on these characteristic elements. In particular, documents are represented by a set of features which correspond to blocks (significant visual elements) composed of a textual block header (e.g., a sequence of characters displayed on the upper left of the block). The blocks and their associated textual block headers can be provided by an OCR system outputting basic structural and textual information for the document. The exemplary method relies on a dictionary (distribution of blocks), trained on a large set of documents, which can be compacted to include only the most frequent entries. For a new document collection, similarity between documents and/or clustering of the documents is based on occurrences of block headers in the dictionary. The exemplary method achieves good results in clustering documents by their type, when compared to existing methods.

The system and method rely on the assumption that business documents generally follow some structuring rules (which could be implicit or even loosely respected) supporting specific and meaningful information for the reader. The detection of these types of structures allows grouping documents according to both their content and semantics carried by these structures.

As an example, consider an organization which wishes to process a collection of its documents. The documents may be from one or many different sources and many different formats. The objective is to discover, in an unsupervised way, patterns in this flow of documents and to group them according to their type, such as discovering coherent groups of invoices, coherent groups of orders, or coherent groups of contracts. Other types of document that are generated from a common template are also contemplated.

The system and method find application, for example, in business process discovery and modeling, and in selecting an appropriate document processing stream based on the identified document type.

Figure 1:
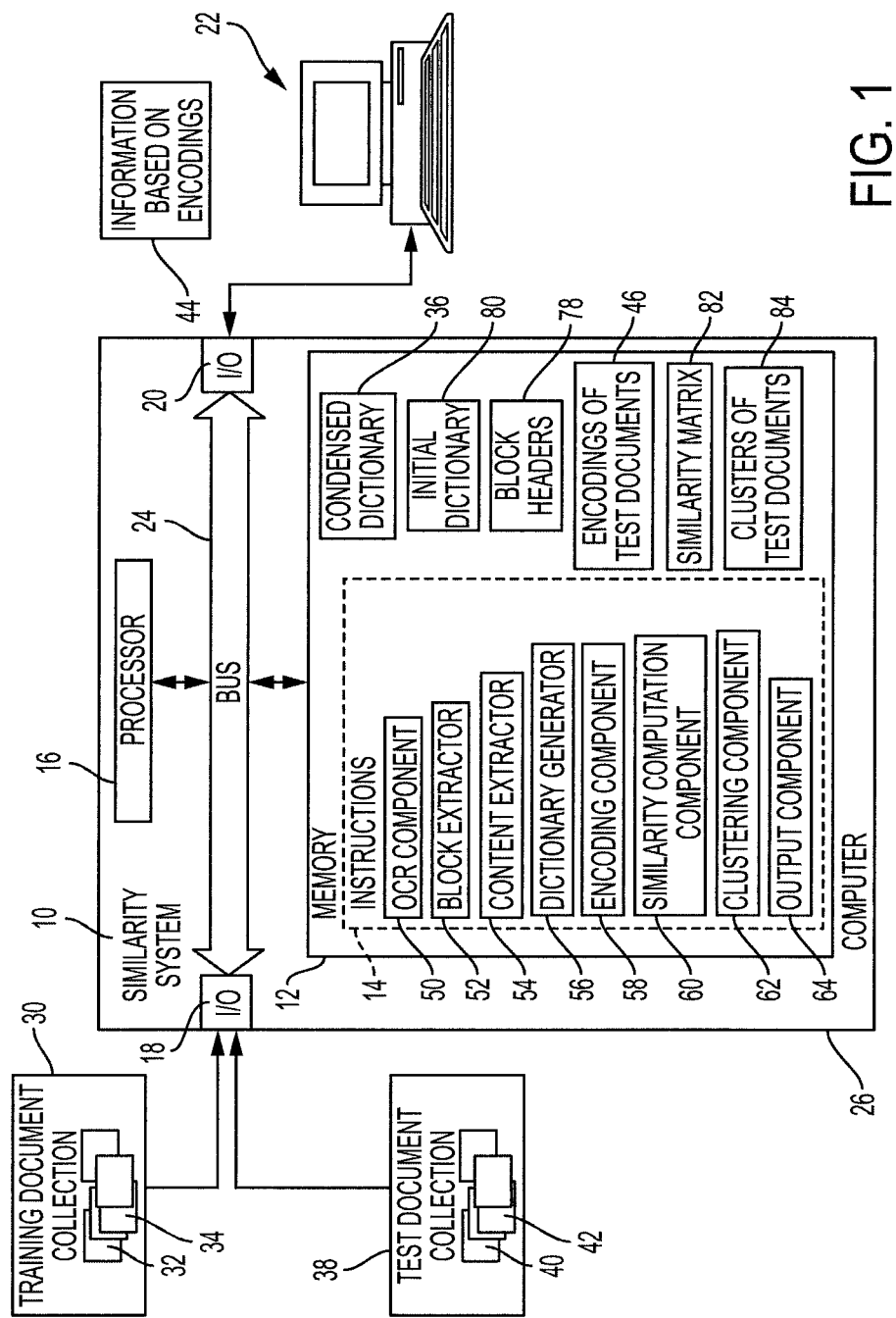
FIG. 1 is a functional block diagram of a system for exacting regularities in a document collection for encoding documents.

FIG. 1 shows a functional block diagram of a computer-implemented system 10 for recognizing similarities between documents, based on structural and content-based features. The system 10 includes memory 12, which stores software instructions 14 for performing the exemplary method, and a processor 16, in communication with the memory 12, which executes the instructions. In particular, the processor 16 executes instructions for performing the method outlined in FIGS. 2 and/or 3. The processor may also control the overall operation of the system 10 by execution of processing instructions which are stored in memory 12. Computer system 10 also includes one or more input/output (I/O) interfaces 18, 20, for communicating with external devices, such as the illustrated client device 22. The various hardware components 12, 16, 18, 20 of the computer 10 may be all connected by a bus 24. The system may be hosted by one or more computing devices, such as the illustrated server computer 26.

The system 10 receives, via input 18, a training collection 30 of documents 32, 34, etc. While only a few documents are illustrated, it is to be appreciate that the collection 30 may include a large number of documents, such as at least 100, or at least 500, or at least 1000 documents, each document including at least one page. The documents in the collection 30 may be scanned documents, in particular, scanned copies of original documents in paper form that include text content. The system uses the training collection 30 to build a condensed dictionary 36, which is used in encoding one or more test documents a test collection 38 of documents 40, 42, etc. The exemplary method is unsupervised and thus does not require the training documents to be manually or otherwise labeled. The system 10 outputs information 44, based on an analysis of documents 40, 42 in the test collection 38. This may include computing a measure of similarity between documents 40, 42 in the test collection, the similarity being computed on the encodings 46 of the test documents.

In the exemplary embodiment, the training collection 30 and test collection 38 contain different documents from each other. In other embodiments the same collection 30 of documents may be used to both build the dictionary 36 and perform the analysis, or there may be a partial overlap between the collections 30, 38.

The illustrated instructions 14 include an optical character recognition (OCR) component 50, a block extractor 52, a content extractor 54, a dictionary generator 56, an encoding component 58, a similarity computation component 60, a clustering component 62, and an output component 64. In some embodiments, the (OCR) component 50 may serve, at least in part, as the block extractor 50 and/or content extractor 54.

Briefly, the OCR component 50 preprocesses the scanned input documents 32, 34, 40, 42 to identify characters and their locations on each document page, e.g., as an XML file which provides block content and position information). An example document page 32 is shown in FIG. 4. In the case of documents in other formats, such as HTML, XML, PDF, or RTF, where the characters and their locations are known, the OCR processing may be omitted.

The block extractor 52 may process each of the document pages 32 to identify a set of content blocks 70, 72, 74, 76, etc. (FIG. 4), each block including a set of the identified characters. This may include segmenting each document page based on the identified characters. The OCR component 50 may serve as the block extractor 52.

The content extractor 54 extracts text content from each content block 70, 72, 74, 76, including, for each block, identifying a block header (BH) 78, which is an initial sequence of the characters in the respective block.

The block extractor 52 and content extractor 54 process the test documents 40, 42 in the same manner as the training documents 32, 34.

Figure 5:
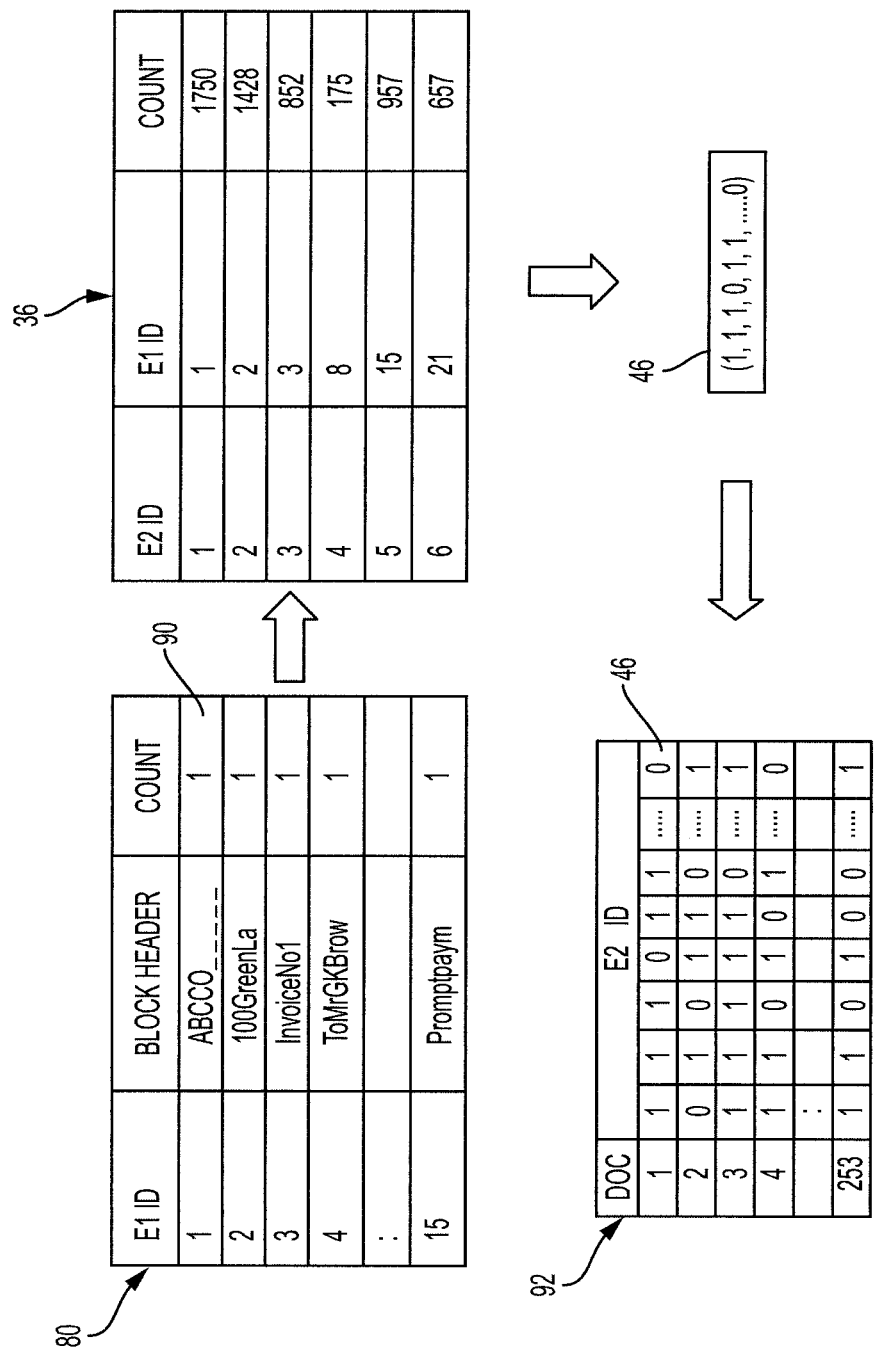
FIG. 5 illustrates generating initial and condensed dictionaries for encoding documents.

The dictionary generator 56 generates an initial dictionary 80, and generates the condensed dictionary 36 therefrom. The initial dictionary 80, which can be any suitable data structure, stores information about the extracted block headers 78. In particular, the dictionary stores a set of entries, each entry being in the form of a tuple which includes a sequence of characters composing the block header 78, a block header identifier (E1 ID), which can be an index starting from 1 and incrementing for each new entry, and a number of occurrences of that block header in the training document collection 30. An example initial dictionary is illustrated in FIG. 5. The condensed dictionary 36, which can be any data structure, stores a set of entries, stores information on the only most frequently-occurring block headers, i.e., only a subset and less than all of those referenced in the initial dictionary. As illustrated in FIG. 5, for example, the condensed dictionary 36 includes a set of entries, each entry being in the form of a tuple which includes a block header identifier (E2 ID), an identifier (E1 ID) referring to the entry in E1 storing the characters composing the block header 78 (or the sequence of characters themselves), and optionally a number of occurrences of the block header in the training document collection 30. This last piece of information is not needed in the exemplary embodiment, but could be used in some embodiments to provide a weight to indicate the relevance of the respective block header.

The encoding component 58 encodes each test document 40, 42, etc., based on the block headers 78 it contains, that are indexed in the condensed dictionary 36. For example, the encoding 42 includes a value for each block header identifier E2 ID in the condensed dictionary.

The similarity computation component 60 computes a similarity measure between pairs of test documents 40, 42, based on their encodings 46. The computed similarities may be stored in a similarity matrix 82 or other data structure.

The clustering component 62 identifies clusters 84 of similar test documents, based on the computed similarity measures. Alternatively, the clustering may be performed directly on the encodings 46.

The output component 64 outputs information 44, based on the encodings for the test collection, such as information on the documents assigned to one or more of the clusters 84.

The computer 26 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 14 may be combined in a single chip. The network interface 18, 20 may include a modulator/demodulator (MODEM) a router, a cable, and and/or Ethernet port.

The digital processor 16 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
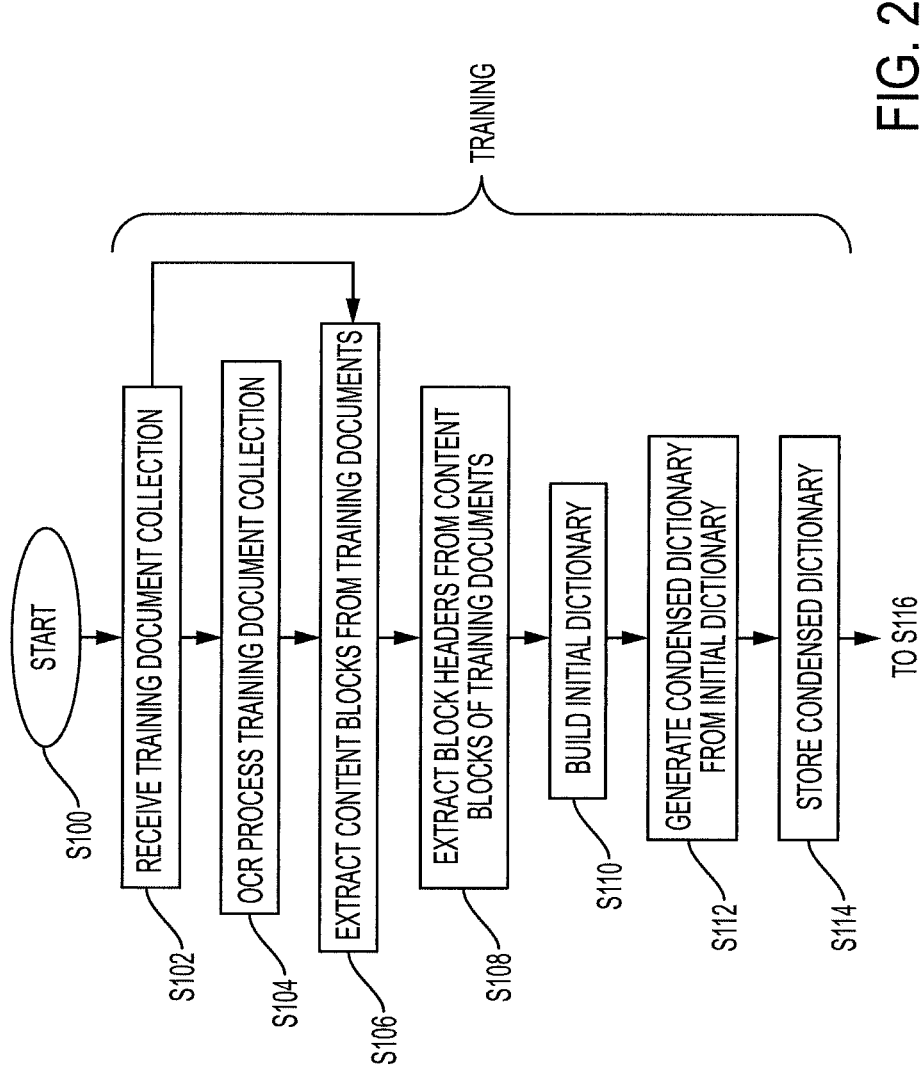
FIG. 2 is a flow chart illustrating a method for extracting regularities from a collection of documents.

With reference to FIG. 2, a method for generating a condensed dictionary 36 for use in encoding documents and recognizing similarities between the documents based on structural and content-based features is shown. The method begins at S100.

At S102, a training document collection 30 is received, and may be temporarily stored in memory accessible to the processor 16, such as memory 12.

At S104, the documents 32, 34, etc., in the training document collection may be preprocessed, e.g., OCRed, by the OCR component 50. This step may be omitted for documents for which the text content and its locations is already known.

At S106, text content blocks 70, 72, 74, 76 are extracted from the documents 32, 34 in the training document collection, based on the identified text, by the block extractor 52.

At S108, block headers 78 are extracted from the text content blocks of the training documents, by the content extractor 54. Each extracted block header is a character sequence consisting of no more than a predetermined maximum number of characters. The extraction may include preprocessing of the test content, such as filtering the text content in the block to remove characters that are not in a predefine character set (e.g., removing punctuation and/or spaces between words) prior to extracting the character sequence from the beginning of the sequence, in a predefined reading direction.

At S110, an initial dictionary 80 is built, based on the block headers extracted from the training documents, by the dictionary generator 56.

At S112, a condensed dictionary 36 is generated from the initial dictionary 80, by the dictionary generator 56.

At S114, the condensed dictionary 36 is stored in memory, such as memory 12.

This ends the training stage. Once training is complete, the dictionary generator 56 is no longer needed and may be omitted from the system. In other embodiments, training and analysis may be performed on separate computing devices.

Figure 3:
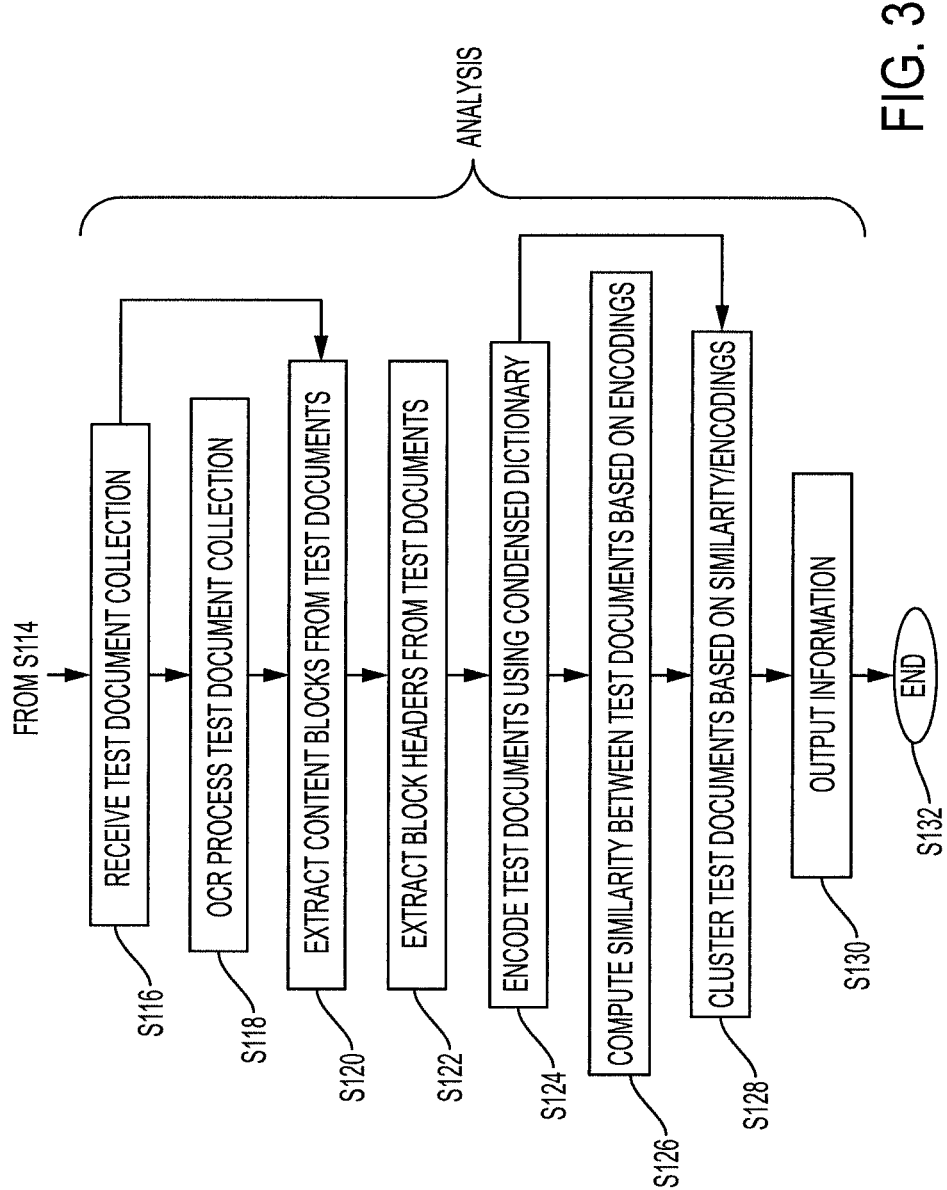
FIG. 3 is a flow chart illustrating a method for using the regularities extracted from the collection of documents for encoding and clustering documents.

With reference to FIG. 3, a method for recognizing similarities between documents based on structural and content-based features, using the condensed dictionary 36, is shown.

At S116, a test document collection 38 is received, and may be temporarily stored in memory accessible to the processor 16, such as memory 12.

At S118, the documents 40, 42 in the test document collection 38 may be preprocessed, e.g., OCRed, by the OCR component 50, as described for S104.

At S120, text content blocks 70, 72, 74, 76 are extracted from the documents in the test document collection, based on the identified text, by the block extractor 52, as described for S106.

At S122, block headers 78 are extracted from the text content blocks of the test documents, by the content extractor 54, as described for S108.

At S124, the test documents 40, 42 are encoded using the condensed dictionary 36, which was generated at S112, by the encoding component 58, to generate document encodings 46.

At S126, optionally, similarity is computed between pairs of test documents 40, 42, based on their encodings 46, by the similarity computation component 60.

At S128, the test documents 40, 42 are clustered, based on their encodings/similarities, by the clustering component 62.

At S130, information 44 is output, by the output component 64, based on the encodings, computed similarities, and/or clusters.

The method ends at S132.

The methods illustrated in FIGS. 2 and 3 may be implemented in a computer program product or products that may be executed on a computer or computers. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the method. As will be appreciated, while the steps of the method may all be computer implemented, in some embodiments one or more of the steps may be at least partially performed manually.

Further details of the system and method will now be described.

Received Documents (S102, S116)

The exemplary method is particularly suited to the unsupervised discovery of coherent groups of documents that follow some strict content structuring guidelines (e.g., forms, or template based documents).

The documents processed by the method can have been generated according to many different types of layout, such as single column or multi column. Each document may contain various elements, such as titles, paragraphs, tables, lists, blocks of text, and so forth. Documents can be saved using various formats (plain text, HTML, XML, PDF, RTF, etc.).

OCR Processing (S104, S118)

The collections of paper-based documents that have been scanned are converted into an electronic text using Optical Character Recognition software. Some OCR software can generate either a plain text version, or a more structured one using XML for instance. In this latter format, text segments are grouped into blocks. This structuring can be used as the block extraction, although another methods can be used, as discussed below. Even though the OCRed version of a scanned document may be in a structured format, such as XML, the formatting is only used to encapsulate detected characters into various blocks. No semantic or hierarchical structure is used. Furthermore since the method can deal with a large variety of document types (e.g., reports, emails, forms, other template-based documents) the method is desirably agnostic with respect to these formats. For example, there is no customization performed whether the document is a form or a report.

The block segmentation provided by OCR tools can be used as is. Hierarchical or node heritage information is thus not taken into account. Furthermore, as described below, only a subpart of these blocks to is used to build a bag of blocks. The semantics that are considered by the method are not related to words or concepts but to the way information, or more specifically groups of pieces of information, are displayed in documents. Furthermore this semantic information does not come from one document only, but only emerges from a large collection of documents.

Extracting Blocks (S106, S120)

To accommodate the differences in document saved format but enable an encoding of the core structure and content (characteristic elements) to be used for similarity calculus, the concept of blocks is used. A block, such as blocks 70, 72, 74, 76 shown in FIG. 4, is a consistent area within a given document. To be more specific, it means that elements within a block should be consistent with each other and whenever there is a rupture in this consistency, then this is the delimitation between two different blocks.

For example a section title should be extracted in different block from its related section. In the same way, the content of each cell within a table should be considered as a different block. The concept of a hierarchy of the blocks is not considered in the extraction.

In the exemplary embodiment, text blocks are permitted to include text occurring on more than one line of text, such as coherent paragraphs, as illustrated for blocks 74 and 76.

Any suitable method for segmenting a document into blocks may be employed. However, the same segmentation method is used for all documents 32, 34, 40, 42, i.e., when creating the dictionaries $E_1$, $E_2$ and when performing the analysis.

In one embodiment, the text blocks are output by the OCR component 50. Other techniques may be used for extracting blocks which take as input the OCR output and use geometric or typographical features (font type, font size, etc.) to identify consistent elements of a page. Some of these methods first cut the page into large segments and progressively cut them into smaller sizes. Examples of such methods include the X-Y Cut algorithm, described by Nagy, et al., "A prototype document image analysis system for technical journals," Computer, 7(25): 10-22, 1992, and the Smearing algorithm, described by Wong, et al., "Document analysis system," IBM Journal of Research and Development, 26(6): 647-656, 1982. Other methods are useful for segmenting pages one dimensionally, into columns. U.S. Pub. Nos. 20130343658, 20140365872, 20150169510, incorporated herein by reference, also describe segmentation methods which can be used.

Although the block extraction algorithm used may identify the locations of the blocks with respect to the page, this information is ignored in the exemplary method. The only information needed is the textual content of the blocks. Additionally, while the block extraction may identify non-text blocks, such as blocks including photographs and drawings, these blocks without text content can be ignored.

Extracting Block Headers (S108, S118)

The exemplary method is based on the assumption that a key differentiator for creating clusters of documents (with the objective of grouping documents sharing regularities in their composition), is not carried by un-localized elements in the text (i.e., a bag of words) but rather by short, ordered sequences of characters, termed block headers 78. Each extracted block header is extracted from only a single block (i.e., does not span two or more extracted blocks), although multiple occurrences of the same block header can be extracted from respective different blocks. In the exemplary embodiment, for each text block 70, 72, etc., a maximum of one block header 78 is extracted.

Therefore, rather than considering standard bags of words to build statistical comparison models, the present method uses bags of block headers. The assumption is that similarities can be detected using recurring occurrences of specific sets of block headers within documents. Similar sequences of section titles, or text field titles in forms may emerge from a large corpus, whatever may be discussed in these documents. The extraction of block headers need not follow in any predetermined order since the extracted block headers for a document 40, 42 to be tested are considered as a bag of block headers, without reference to the positions of the blocks on the page. The methodology used to extract and normalize the block headers is not critical, however, it should be standardized, so that a representation of set of block headers 76 extracted from a given document can serve as a document signature for that document.

In the exemplary embodiment, each character in a given sequence is an (OCR-recognized) character drawn from a predefined character set, such as the set of alphanumeric characters, although larger or different character sets may be employed. In the illustrated examples, the character set excludes punctuation and spaces. The content of the block may thus be preprocessed to remove characters not present in the predefined character set. The (maximum) size nmax (number of characters) of each block header sequence 78 is fixed such that a given sequence may include fewer than all the characters in a given block. The sequence is extracted from the block in normal reading order, which means starting in the upper left side of each block in the case of English and other left-to-right languages. Each extracted block header is thus the first nmax characters extracted from the block (in conventional reading order). Where the block includes less than nmax characters in total, the extracted block header may be a sequence of fewer than nmax characters.

A suitable length nmax for the blockhead sequence can be determined by cross validation on a given task, such as clustering. nmax may vary, depending on the type of documents being processed, however, once selected, the same value n is used for all documents (training and test). For processing forms and other template-based documents, where many of the blocks contain short titles, such as "First Name," "Date," "Address," etc., a relatively small value of nmax may be used. Additionally, if nmax is too large, problems may arise from OCR errors. Depending on the quality of the scanned pages, the OCR output may be extremely noisy, such that two block headers which should be recognized as the same are not. Problems also arise because subsequent text in the block may differ between documents. If the block header is too short, the block header may not be very informative. For example, very frequent short words or phrases, like "the" may occur in many documents that are otherwise quite dissimilar, which could be addressed by lengthening the sequence to include additional characters. The goal is to be able to identify a fairly large collection of block headers, and for a given document to be analyzed, have several ones of these block headers identifiable in the document.

As an example, nmax may be at least 6 or at least 8, or at least 10, and may be up to 50 or up to 20, or up to 15. In the exemplary embodiment, nmax is selected to include at least a part of two consecutive words for at least a subset of the block headers, such as at least 20% or at least 20% of block headers, although some block headers may include parts of more than two consecutive words, e.g., at least three words, depending on their size. Thus the block headers extracted from the collection can be generated from different numbers of words. For the experiments described below, a maximum length nmax of 11 characters was used.

In one embodiment, nmax is selected such that at least some of the extracted block headers are derived from only an initial portion of the text content of the respective block. As a result, a sizeable proportion (e.g., at least 20% or at least 40%) of the extracted block headers, are shorter, in length, than the character sequence which could otherwise be extracted from the respective block.

A minimum length may also be considered to remove non-useful pieces of information. For example, blocks of less than a minimum number nmin of characters may be excluded from further consideration. For the experiments detailed below, a minimum size nmin of 3 characters was enforced.

This approach of characterizing blocks based on relatively short sequences may create some ambiguity, since short sequences of characters may be not sufficient to separate two different blocks starting with the same sequence of characters. However, ambiguity also exists in standard bags of words methods. By having a fairly large set of block headers represented in the dictionary 36, ambiguities arising from a few of them may not be significant when clustering documents based on multi-dimensional vectors derived from identified block types.

Building Initial Dictionary (S110)

As illustrated in FIG. 5, an initial dictionary 80, denoted $E_1$, is created, which includes, for each unique block header identified in the collection 30, a block header identifier $E_1$ ID, and a count of the block header occurrences in the document collection. Considering the collection 30 as a set S of n documents $S=\{D_0, D_1, \ldots D_n\}$, the initial dictionary can be generated according to Algorithm 1:

---
Algorithm 1
---
Create empty data structure Dictionary $E_1$, containing for each row/entry the following information:
    Sequence of characters of the block header;
    Block header identifier (i.e., index of the of the block header in the dictionary); and
    Number of occurrences of the block header in the considered collection of documents.
For each document $D_i \in \{ D_0, D_1, \ldots D_n \}$ do
    a. Extract the set $SB_i = \{B_{i0}, B_{i1}, \ldots B_{im}\}$ of m block headers for the document $D_i$ (as described above)
    b. For each block header $B_{ij}$ in the set $SB_i$ do
      i. Perform a dictionary look-up to test if $B_{ij} \in$ Dictionary $E_1$
      ii. If not do: add a new data entry $e_{1k} = \{x_{1k}, y_{1k}, z_{1k}\}$ within $E_1$ defined as follows: $E_1 = E_1 + \{e_{1k}\}$, where
        k = Dictionary size
        $x_{1k}$ = Sequence of characters in $B_{ij}$
        $y_{1k}$ = k = $B_{ij}$ Identifier
        $z_{1k}$ = Number of occurrences of $B_{ij}$ in the collection = 1
      iii. Else do: increment (+1) the number of occurrences of the matching block header in the dictionary $E_1$:
        $e_{1p} = \{x_{1p}, y_{1p}, z_{1p}\}$ where
        $e_{1p}$ is the data triple associated with $B_{ij}$ as $B_{ij} \in E_1$
        $z_{1p} = z_{1p} + 1$
---

As shown in Algorithm 1, at S108, the documents may be first processed to identify all of the block headers in the document pages, irrespective of whether they have been observed before. Then, working through the list, which can be performed in any order, each block header is checked against the current dictionary $E_1$ to see if there is already an entry for the block header sequence. If not, a new entry 90 (row of the table 80 is created), as illustrated in FIG. 5. On the other hand, if there is already an entry for that block header sequence, the count is simply incremented by 1.

Generating Condensed Dictionary (S112)

The condensed dictionary 36, denoted $E_2$, is generated from the initial dictionary $E_1$. The aim at this step is to identify a subset of the entries in dictionary $E_1$ whose frequency in the document collection 30 makes them suited to generating an informative encoding 46 of a text document, while limiting the number of block headers represented in the encoding to a reasonable number. This may be performed according to Algorithm 2, using a filtering method, as described below:

---
Algorithm 2
---
Once every document has been processed according to Algorithm 1, create a new empty dictionary $E_2$ which is a compacted version of $E_1$ with the following data structure, for each row $e_{2q} = \{a_{2q}, b_{2q}, c_{2q}\}$:
$E_2 = \{ e_{20}, \ldots, e_{2q}, \ldots, e_{2r} \}$, where
    r = size of $E_2$ − 1
    $a_{2q}$ = Identifier of a Block header in $E_1$
    $b_{2q}$ = Identifier of the Block header in $E_2$
    $c_{2q}$ = the number of occurrences of the block in the collection
---

Dictionary $E_2$ is a compacted version of $E_1$, meaning that only the most frequent block headers are kept. The assumption is that these reflect the characteristic elements occurring in forms or template-based documents. Several ways of filtering $E_1$ to populate $E_2$ are contemplated. As an example, any of the following filtering criteria may be used:

1. Select the top K number of block headers in terms of their occurrences in the collection 30, where K is less than the number of unique block headers found.
2. Select the top K percentage of block headers in terms of their occurrences in the collection 30, such as up to 40%, such as the top 20%.
3. Select the block headers which equal or exceed a threshold T1 number of occurrences in the collection 30.
4. A combination of two or more of these filtering methods.

In one embodiment the threshold T1, designed to filter out low frequency block headers, can be used in a filtering method according to Algorithm 3:

---
Algorithm 3
---
Consider: = $\{ \{Occ_1, Dist_1\}, \ldots, \{Occ_k, Dist_k\} \}$, where:
    $Occ_i$ is a unique value reflecting a specific number of occurrences,
    $Dist_i$ is the set of block header identifiers where each block header shares the same number of occurrences
Let $O = O_1 \cup O_2$, where
    $O_1 = \{ \{Occ_1, Dist_1\}, \ldots, \{Occ_n, Dist_n\}\}$, where all $Occ_j\ O_1 \geq T$
    $O_2 = \{ \{ Occ_m, Dist_m\}, \ldots, \{ Occ_p, Dist_p \}\}$ where all $Occ_j \in O_2 <$ T1
    And $\Sigma_{i-1}{}^n Dist_i > \alpha\ \Sigma_{j-m}{}^p Dist_j$, where
      $\alpha \subset [0, 1]$
For each data entry $e_{1i} = \{x_{1i}, y_{1i}, z_{1i}\} \in E_1$ composed of an identifier $y_{1i}$ and a number of occurrences $z_{1i}$.
If $z_{1i} \geq$ T1 then do
    Create a new data entry $e_{2q} = \{a_{2q}, b_{2q}, c_{2q}\}$ in $E_2$ with the following data:
      $a_{2q}$ = Identifier of the Block header in $E_1 = y_{1i}$
      $b_{2q}$ = Identifier of the Block header in $E_2$ = (Size of $E_2$) + 1
      $c_{2q}$ = number of occurrences of the Block header in the collection = $z_{1i}$
---

The dictionary $E_2$ allows encoding documents into a compacted vector space. Each element of an encoded document vector 46 represents one of the entries in $E_2$. The dimensionality reduction strategy (filtering) employed takes into account regularities in various types of structured documents circulating in a business workflow, and can be considered as a feature selection method. The resulting data structure $E_2$ is smaller in size (number of entries) than $E_1$ and includes a set of entries, each with an index corresponding to a respective one of the identified block headers. The number of occurrences $c_{2q}$ of the Block header in the collection is not needed in the exemplary embodiment, although in some embodiments, it could be used for generating a weighting for the respective element of the encoding when computing similarity/clustering. Rather than being the Identifier of the Block header in $E_1$, $a_{2q}$ could be the respective sequence of characters. In one embodiment, each entry in $E_1$ includes a link to the index $E_1$, which provides the block header sequence.

The dimensionality of the encodings can be at least 10, or at least 20, or at least 50, or at least 100, and in some embodiments, may be up to 1000 or up to 500.

Encoding Documents (S124)

The collection of test documents $\{D_0, D_1, \ldots D_n\}$ is encoded with the dictionary $E_2$. Encoding documents using the compacted vector space can be performed as shown in Algorithm 4:

---
Algorithm 4
---
MaxCompacted = size of $E_2$
For each document Di ∈ { $D_0, D_1, \ldots D_n$ } do
  $VD_i = (x_{i1}, \ldots, x_{im})$ is the incidence vector for document $D_i$, where m = MaxCompacted
  For j = 1 to MaxCompacted do
    If block head $B_{ij} \in E_2$ then $VD_i$ [j] = 1
    Else $VD_i$ [j] = 0
---

The result is an incidence matrix IM 92 for the whole document collection:

IM={$VD_0, \ldots, VD_n$} in the MaxCompacted-dimensional vector space.

The exemplary encodings 46 are binary vectors ($VD_i$ [j]∈[1,0]) as illustrated in FIG. 5, where each value is representative of the occurrence of a block header in the document, but ignores the number of those occurrences in the test document. The targeted type of documents (forms or template-based documents) implies that for a given document, the number of occurrences of a given block header within the document is not useful as generally specific data fields or section titles do not occur twice in the same document. Alternatively, the values in the encodings may be representative of the number of occurrences in the test document, so numbers other than 0 and 1 are permitted.

In some embodiments, other features may be taken into account, such as the order or positioning of text content blocks.

In some embodiments, documents lacking a threshold amount (number or proportion) of non-zero values in their encodings 46 are filtered out prior to computing similarity and/or clustering.

Similarity Computation (S126)

This step may include computing a similarity matrix 82 for the document collection 38. The matrix 82 includes a similarity for each pair of documents computed from their encodings. As the measure of similarity, the standard cosine similarity can be used.

The similarity matrix SM 82 may be built according to Algorithm 5:

---
Algorithm 5
---
MaxDocument = number of documents in the collection
For i = 0 to (MaxDocument − 2)
  $Lg_i = |VD_i| = (x_{i1}^2 + \ldots + x_{im}^2)^{1/2}$
  For j = i + 1 to (MaxDocument − 1)
    $Lg_j = |VD_j| = (x_{j1}^2 + \ldots + x_{jm}^2)^{1/2}$ ---
Algorithm 5
---
LengthProduct = $Lg_i \times Lg_j = (x_{i1}^2 + \ldots + x_{im}^2)^{1/2} \times (x_{j1}^2 + \ldots + x_{jm}^2)^{1/2}$ $Sim_{ij} = VD_i \cdot VD_j = x_{i1}x_{j1} + \ldots + x_{im}x_{jm}$ $SM[i, j] = \beta\left(\dfrac{Sim_{ij}}{LengthProduct_{ij}}\right)$
---

In this embodiment, the similarity $Sim_{ij}$ between two documents is the dot product (cosine similarity), although other measures for computing similarity between vectors are also contemplated. β can be a fixed value, such as 1, or may be a variable, e.g., as described below. The similarity score for two documents SM [i,j] is a function of $Sim_{ij}$ (and in some embodiments may be equal to $Sim_{ij}$).

In one embodiment, the similarity measure may take into account the number of characteristic compacted blocks present within a document. The assumption is that the more elements (compacted blocks) are taken into account for the similarity calculus, the higher the confidence in the similarity will be. In order to take this into account, the similarity calculus may incorporate a variable β, which is a function of the similarity between the two vectors:

$$\beta = \mathrm{atan}((Sim_{ij} + 1)^2) - \left(\dfrac{1}{Sim_{ij} + 2}\right) - \dfrac{1}{2}$$

and the similarity between the two documents is computed as:

$$SM[i, j] = \beta\left(\dfrac{Sim_{ij}}{LengthProduct_{ij}}\right),$$

corresponding to $$SM[i, j] = \left(\mathrm{atan}((Sim_{ij} + 1)^2) - \left(\dfrac{1}{Sim_{ij} + 2}\right) - \dfrac{1}{2}\right)\left(\dfrac{Sim_{ij}}{LengthProduct_{ij}}\right)$$

Other methods of similarity computation which could be employed herein may be based on the Euclidean distance, Manhattan, maximum, or binary distance metrics.

Clustering (S128)

Let T2 ⊂ [0,1] be considered as a threshold used to filter out documents that are not considered as similar. Several methods can be used to define this threshold, depending on the objective. As an example, the following method is used. Let LC be a list of clusters, each cluster being composed of a list of documents. Algorithm 6 illustrates an example clustering method based on the computed similarity scores, SM [i,j].

---
Algorithm 6
---
For i = 0 to (MaxDocument − 2)
  For j = i + 1 to (MaxDocument − 1)
    If SM [i,j] > T2 then do
      Get a sub list SL of clusters $C_k$ from current list of clusters LC for which:

```
                    Algorithm 6

$D_j \in C_k$, and
        $k \subset [0, \text{MaxDocument} - 1]$
        If SL is empty then
            Create a new cluster $C_k = \{ D_j \}$, where k = size
            of LC
            Add $C_k$ to :
                LC = LC + { Ck }
        If SL is not empty then do
            MaxSL = size of SL
            For p = 0 to P = MaxSL - 1
                SL [p] = SL [p] + { $D_j$ }
            P = MaxSL
```

This method iteratively identifies document pairs whose similarity score exceeds the threshold similarity score T2. If the first document $D_i$ is not yet in a cluster, a new cluster $C_k$ is created to which $D_i$ is added. Then the second document $D_j$ is added to the clusters in which $D_i$ is found. This method results in documents being assigned to more than one cluster. A filtering method can be used to ensure that no document is assigned to more than one cluster.

Other clustering techniques can be used. For example, clustering methods employing k-means may be used. This method aims to partition the vectors into k clusters in which each vector belongs to the cluster with the nearest mean, serving as a prototype of the cluster. Such methods are described, for example, in U.S. Pat. No. 5,787,420. An iterative clustering method as described in US Pub. No. 20130262465, published Oct. 3, 2013, entitled FULL AND SEMI-BATCH CLUSTERING by Matthias Gallé, et al. may be employed. This method iteratively clusters data points (here, the encodings) among the clusters by assigning the data points to the clusters based on a comparison measure of each data point with a representative point of each cluster (after optionally subtracting the threshold similarity), and based on the clustering, computing a new representative point for each of the clusters, which serves as the representative point for a subsequent iteration. Other methods may combine the encodings with other features, such a temporal features, as described, for example, in US Pub. Nos. 20130262465 and 20150127323, published May 7, 2015, entitled REFINING INFERENCE RULES WITH TEMPORAL EVENT CLUSTERING, by Jacquet, et al. US Pub. No. 20160179923, published Jun. 23, 2016, entitled ADAPTIVE TRAJECTORY ANALYSIS OF REPLICATOR DYNAMICS FOR DATA CLUSTERING, by Chehreghani describes a top-down approach to clustering which progressively subdivides one cluster into smaller clusters. Other suitable clustering techniques are described in Leonard Kaufman, et al., "Finding Groups in Data An Introduction to Cluster Analysis," published by John Wiley & Sons, New York, 1990.

The maximum number of clusters can be set in advance or may be unlimited.

In some embodiments, clusters below a threshold size (number of documents) are ignored/filtered out. In some embodiments, documents which do not meet a threshold level of similarity with any of the clusters are ignored/filtered out.

Information Output (S130)

The information output may depend on the intended use of the method. In one embodiment clusters of documents may be assigned to different processing workflows. In other embodiments, the document encodings may be used for information retrieval, e.g., by using the encoding of one document to retrieve document(s) from the collection having similar encoding(s).

The method can be used to analyze document workflow in order to discover specific categories of documents: those based on a specific structure (e.g. invoices, surveys, quarterly reports, etc.). This helps discovering and quantifying on-going business processes in an unsupervised way.

A manual step may include manually reviewing some or all of the documents in a cluster and labeling the cluster according to the type of documents present.

The method described herein incorporates both dimensionality reduction and document structure and semantics based clustering. These two aspects are highly correlated in the exemplary block header-based method as dimensionality reduction is not primarily an optimization designed to reduce computation but rather provides a semantic bias used along with document structure to facilitate clustering of targeted types of documents. The dimensionality reduction strategy which takes into account regularities in various types of structured documents circulating in a business workflow, can be described as a feature selection method. The exemplary method uses bags of block headers and more specifically only a fraction of these blocks which are normalized into the dictionary, reducing dimensionality of the resulting encodings. Document clustering is primarily based on this vector space representation.

The method thus differs from existing methods and can rely on block segmentation provided by OCR tools as is, i.e., without taking into account any specific hierarchical or node heritage information into account. Furthermore only a subset of these blocks is used to build the bag of blocks. The semantics that are considered by the method are not related to words or concepts but to the way information, or more specifically groups of pieces of information are displayed in documents. Furthermore this semantic information does not come from one document only, but only emerges from a large collection of documents.

Another difference from some existing methods is that the exemplary method does not need to train the system with annotated data.

Without intending to limit the scope of the exemplary embodiment, the following Example illustrates the application of the method.

EXAMPLE

The exemplary block header-based (BHB) method described herein (employing Algorithms 1-6) was compared with existing methods based on Probabilistic Latent Semantic Analysis (PLSA) and a Latent Semantic Analysis (LSA) implemented with word-based clustering, in two experiments:

Experiment 1

Two sets 30, 38 of business documents (specifically, banking documents such as loans, mortgages, bank statements, etc.) were obtained. The first set 30 is composed of 1046 files (PDF format) containing scanned pages. Each file (document) is composed of about 10 pages. This data set is used to build dictionaries 80 $E_1$ and 36 $E_2$, using Algorithms 1 and 2, as described above, on each document page.

The second data set 38 is composed of 92 files (PDF format), different from those in the first set 30, containing a total of 866 scanned pages. The second set 38 is used for the analysis performed using the three approaches: BHB, PLSA, and LSA.

The goal of this experiment is to discover, in an unsupervised way, business documents that are similar. The definition of the similarity is ideally: documents using the same form or same template (structure). The aim is thus to discover types of business documents (and to count them) passing through a workflow. Documents that are not similar are not of interest.

While the same data set could be used to both build the dictionary 36 and run the experiment, it was decided to mirror real business conditions where time matters and when a data model is built from time to time on typical documents, then used on daily operations to screen existing workflows.

The compacted dictionary 36 built from the first data set is used to process the second data set. The parameters used for BHB were: T1=3, β=1, T2=65%. Pages that are kept after filtering in the BHB method are those containing enough elements (above T1) from $E_2$ and therefore selected by the method as worth being analyzed. From the initial 866 pages, the number remaining after filtering was 660 and the number of clusters initially created was 137.

In order to evaluate the performance, 73 clusters were randomly selected from the 137 and their content checked manually to rate document similarity.

The PLSA algorithm was also evaluated. As the word-base clustering algorithm used requires a pre-set number of expected clusters, the number of expected clusters was set to the same number (137) as created by the BHB method. A randomly selected a subset of 25 clusters grouping a total of 161 pages was selected for manual evaluation.

Results are shown in TABLE 1, which uses the following definitions:

Coherent clusters: a cluster is considered as coherent if more than 90% of the pages contained in this cluster are correctly associated.

Precision with respect to pages is computed as:

$$Precision = \left(\frac{\sum_{i=1}^{n} Precision_i}{n}\right)$$

where $Precision_i$ is the precision computed for cluster i, and
n=the number of clusters Precision with respect to coherent clusters has been computed as:

$$Precision = \left(\frac{k}{n}\right)$$

where k=the number of coherent clusters and
n=the number of clusters

TABLE 1

| Clustering results using the BHB and PLSA methods | | |
|---|---|---|
| | BHB method | PLSA with word-based clustering |
| # Pages clustered | 334 | 161 |
| # pages correctly associated | 288 | 87 |

TABLE 1-continued

| Clustering results using the BHB and PLSA methods | | |
|---|---|---|
| | BHB method | PLSA with word-based clustering |
| # of clusters | 73 | 35 |
| # of coherent clusters | 59 | 7 |
| Precision wrt pages | 84.6% | 56.7% |
| Precision wrt clusters | 80.8% | 28.0% |

For the LSA method, the same corpus was processed, but without specifying any objective in terms of expected number of clusters. The system generated 35 clusters. Of these, 12 clusters contain less than 4 documents, 23 clusters contain more than 3 documents. Over the 866 initial documents, 17 are distributed among the 12 small clusters and 849 are distributed among the 23 larger ones. A full manual evaluation of these clusters was not made. However, an overview indicated that the coherence is significantly lower than for BHB and PLSA.

Experiment 2

2270 scanned document pages related to doctor visits, medical test results, medical exams, medical reimbursement forms, etc., were obtained. The same data set was used to create the dictionaries and to perform the clustering. Using the exemplary BHB method, 253 clusters were created using 1918 of the pages. To evaluate the performance, 51 clusters were selected randomly from the 253 and their content checked manually to rate document similarity. The results are shown in TABLE 2.

TABLE 2

| Clustering results using the exemplary BHB method | |
|---|---|
| # of manually validated clusters | 51 |
| # of pages in validated clusters | 1155 |
| # of coherent clusters | 50 |
| Precision wrt pages | 99.6% |
| Precision wrt clusters | 98% |

The results confirm that the exemplary method is applicable to different document collections.

Each of the documents referred to herein is hereby incorporated by reference in its entirety.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for encoding documents comprising:
   for each training document in a collection of training documents, segmenting each document page based on characters identified in the document and typographical features of the characters, and not related to words or concepts, to identify a set of text content blocks;
   for each of the text content blocks in the set, identifying a maximum of one block header, the block header comprising a beginning sequence of characters, the beginning sequence consisting of no more than a predetermined maximum number of characters drawn from a predefined character set, whereby for a text content block of greater than the predetermined maximum number of characters, the respective beginning sequence includes fewer than all the characters drawn from the predefined character set in the text content block;

building a condensed dictionary from the block headers identified for the collection of training documents, the condensed dictionary including an identifier for each of only a subset of the block headers comprising the most frequently-occurring block headers identified in the collection of training documents; and for at least one test document:
segmenting each document page based on characters identified in the document and the locations of the characters to identify a set of text content blocks;
for each of the text content blocks in the set, identifying a maximum of one block header, the block header comprising an initial sequence consisting of no more than the predetermined maximum number of characters;
generating an encoding of the test document, based on the identifiers of the identified block headers that are in the condensed dictionary,
wherein at least one of the identifying of the set of text content blocks, identifying of the block headers, building the condensed dictionary, and generating the encoding of the test document is performed with a processor.

2. The method of claim 1, wherein the training documents in the training collection are scanned documents.

3. The method of claim 1, wherein the identifying of the set of text content blocks comprises optical character recognition processing of the respective document.

4. The method of claim 1, wherein the identifying of the block header comprises optionally filtering the text content of the respective block to remove characters from the text content of the block that are not in a predefined character set and extracting a predetermined number of characters, where present, from the optionally filtered text content in a predefined reading direction.

5. The method of claim 1, wherein the predetermined number of characters is at least 6.

6. The method of claim 1, wherein the predetermined number of characters is no more than 20.

7. The method of claim 1, wherein the building of the condensed dictionary comprises building an initial dictionary which comprises a count of each of the identified block headers in the training collection of documents and filtering the initial dictionary to remove block headers having a count that is lower than for others of the block headers.

8. The method of claim 1, wherein the at least one test document comprises a plurality of test documents.

9. The method of claim 8, wherein the method further comprises computing a similarity between test documents in the plurality of test documents, based on their encodings.

10. A method for encoding documents comprising:
for each training document in a collection of training documents, identifying a set of text content blocks;
for each of the text content blocks in the set, identifying a block header, the block header comprising a sequence consisting of no more than a predetermined maximum number of characters;
building a condensed dictionary from the block headers identified for the collection of training documents, the condensed dictionary including an identifier for each of only a subset of the block headers identified in the collection of training documents; and for each of a plurality of test documents:
identifying a set of text content blocks;
for each of the text content blocks in the set, identifying a block header, the block header comprising a sequence consisting of no more than the predetermined maximum number of characters;
generating an encoding of the test document, based on the identifiers of the identified block headers that are in the condensed dictionary; and
computing a similarity between test documents in the plurality of test documents, based on their encodings, wherein the similarity is computed according to:

$$SM[i, j] = \beta\left(\frac{Sim_{ij}}{LengthProduct_{ij}}\right),$$

or a function thereof,
where $$b = \operatorname{atan}((Sim_{ij} + 1)^2) - \left(\frac{1}{Sim_{ij} + 2}\right) - \frac{1}{2},$$

$Sim_{ij}$ is the dot product of the encodings of test documents i and j; and
$LengthProduct_{ij}$ is the square root of the sum of the squares of the elements of the encodings,
wherein at least one of the identifying of the set of text content blocks, identifying of the block headers, building the condensed dictionary, and generating the encoding of the test documents is performed with a processor.

11. The method of claim 9, wherein the method further comprises filtering out test documents lacking a threshold amount of non-zero values in their encodings prior to the computing of the similarity between documents.

12. The method of claim 8, wherein the method further comprises clustering documents in the plurality of test documents, based on their encodings.

13. The method of claim 1, wherein the encodings are multidimensional vectors, each vector comprising an element for each of the indices in the condensed dictionary.

14. The method of claim 13, wherein the multidimensional vectors each comprise at least ten elements.

15. The method of claim 1, wherein the training document collection comprises at least 100 training documents.

16. The method of claim 1, wherein the method further comprises outputting information based on the encoding.

17. A computer program product comprising a non-transitory recording medium storing instructions, which when executed on a computer, cause the computer to perform the method of claim 1.

18. A system comprising memory which stores instructions for performing the method of claim 1 and a processor, in communication with the memory, which executes the instructions.

19. A system for encoding documents comprising:
a condensed dictionary, stored in memory, built from a collection of training documents, the condensed dictionary comprising an index for each of a set of block headers identified in the document collection, each block header comprising an initial sequence consisting of no more than a predetermined maximum number of characters from a respective identified text block of at least one of the training documents, the condensed dictionary comprising identifiers for only a subset of the block headers identified in the training collection, the subset comprising block headers occurring more frequently in the training collection than others of the identified block headers;

a block extractor which segments each document page of a test page, based on characters identified in the document and geometric or typographical features, to extract text blocks from the test document;

a content extractor which, for each extracted text block extracted from the test document, extracts a maximum of one block headers from the text block;

an encoding component which generates an encoding of the test document, based on the identifiers of the identified block headers that are in the condensed dictionary, the encoding comprising a multi-dimensional vector, each element of the vector representing one of the entries in the condensed dictionary;

optionally, a dictionary generator which generates the condensed dictionary; and a processor which implements the block extractor, content extractor, and encoding component.

20. A method for encoding documents comprising:

providing a condensed dictionary, built from a collection of training documents, the condensed dictionary comprising an index for each of a set of block headers identified in the document collection, each block header comprising an initial sequence consisting of no more than a predetermined maximum number of characters from a respective identified text block of at least one of the training documents, a maximum of one block header being extracted from each identified text block, the condensed dictionary comprising identifiers for only a subset of the block headers identified in the training collection, the subset comprising block headers occurring more frequently in the training collection than others of the identified block headers;

receiving a collection of test documents;

for each test document in the collection of test documents:
  segmenting each document page, based on characters identified in the document and typographical features, to identify a set of text content blocks;
  for each of the text content blocks in the set, identifying a maximum of one block header, the block header comprising a beginning sequence consisting of no more than the predetermined maximum number of characters; and
  generating an encoding of the test document, based on the identifiers of the identified block headers that are in the condensed dictionary; and performing at least one of:
  computing a similarity between test documents in the collection of test documents, based on their encodings; and
  clustering test documents in the collection of test documents, based on their encodings, wherein at least one of the identifying of the set of text content blocks, identifying of the block headers, generating the encoding, and performing the at least one of computing a similarity and clustering test documents is performed with a processor.

* * * * *